United States Patent [19]

Maillet

[11] 3,952,957
[45] Apr. 27, 1976

[54] SHREDDING UNIT FOR CONDITIONING SCRAP METAL PARTS HAVING A MAXIMUM THICKNESS OF 5 MILLIMETERS

[76] Inventor: Edgard Jacques Maillet, Chateau de l'Ermitage, Ludon Medoc, Blanquefort, France, 33290

[22] Filed: Oct. 11, 1974

[21] Appl. No.: 514,085

[30] Foreign Application Priority Data
Oct. 15, 1973  France .............................. 73.36684

[52] U.S. Cl. .............................. 241/73; 241/186 R; 241/190; 241/241
[51] Int. Cl.² .................... B02C 13/06; B02C 13/31
[58] Field of Search ........ 241/73, 74, 186 R, 189 R, 241/190, 239–241, 243

[56] References Cited
UNITED STATES PATENTS

| | | | |
|---|---|---|---|
| 2,797,052 | 6/1957 | Clark | 241/186 R X |
| 2,970,780 | 2/1961 | Bowen | 241/243 X |
| 3,486,704 | 12/1969 | Persky | 241/190 X |
| 3,540,665 | 11/1970 | Snock | 241/73 |
| 3,545,690 | 12/1970 | Burian et al. | 241/190 X |
| 3,703,970 | 11/1972 | Benson | 241/241 |

FOREIGN PATENTS OR APPLICATIONS

| | | | |
|---|---|---|---|
| 607,378 | 7/1926 | France | 241/190 |
| 629,490 | 12/1961 | Italy | 241/186 R |

Primary Examiner—Granville Y. Custer, Jr.
Assistant Examiner—Howard N. Goldberg
Attorney, Agent, or Firm—Edwin E. Greigg

[57] ABSTRACT

The shredding unit comprises a horizontal drum mounted transversely within a cage having a front feed opening. Knives are rigidly fixed on the circumference of the drum which is partially surrounded by an evacuation grid having calibrated holes. In the active or work position, backing knives placed in alignment at each end of the grid and opposite to the drum project inwards from the grid while the knives of the drum pass in the immediate vicinity. Each backing knife is mounted at the extremity of a support plate and is capable of withdrawing under excessive pressure in opposition to a jack which urges the backing knife towards the active position.

10 Claims, 4 Drawing Figures

SHREDDING UNIT FOR CONDITIONING SCRAP METAL PARTS HAVING A MAXIMUM THICKNESS OF 5 MILLIMETERS

This invention relates to the conditioning of recovered scrap metal having a maximum thickness of 5 millimeters.

The problem of conditioning of recovered scrap metal is by no means new. For a long time, this operation has been performed by shearing or oxyacetylene cutting or both of these methods. The constantly rising volume of scrap metal to be processed and in particular the increasing number of motor vehicle wrecks have resulted in an endeavor to improve the efficiency of the process and consequently in the appearance of conditioning by packaging. This method, however, calls for very large installations as well as considerable power consumption and also carries a major disadvantage in that it does not permit the separation of impurities and non-ferrous metals.

Consideration has accordingly been given to the use of a grinding mill equipped with articulated rotary hammers into which the metallic carcasses are passed (car bodies, casings of metallic furniture, of washing machines, of cookers and so forth as well as various containers such as metallic drums and cans) after having removed from these carcasses certain non-metallic and readily detachable parts (such as tires) as well as metallic parts exceeding 5 mm in thickness (engines, gear systems, wheels, tie-rods, steering rods and so forth). Prior to introduction into the grinding mill, the carcasses are usually passed into a flattening unit from which they are conveyed to the feed hopper of the grinding mill. The scrap metal thus produced has the appearance of crumpled and more or less compact balls and these latter pass through a grid which partly surrounds the rotor with articulated hammers. A suction device mounted on top of the grinding mill frees the processed scrap metal from dust and other light waste matter. Beneath the grid, the scrap metal is transferred by means of a conveyor to a magnetic drum (or a number of magnetic drums mounted in cascade). The magnetic drum lifts the scrap metal and projects this latter onto a second conveyor which discharges it directly or indirectly to a storage or loading area whilst the impurities and the non-ferrous metals which are not lifted by the magnetic drum fall onto a transverse belt. Provision can be made for additional devices. Thus, complementary dust extraction is usually carried out in the immediate vicinity or at the level of the magnetic drum or drums and a vibrating screen mounted at least at one point of the path of travel permits the removal of dense impurities such as glass and rigid plastic materials which appear in the form of small fragments at the delivery end of the grinding mill. Provision can be made for a manual sorting operation on the conveyor which transports the non-ferrous products.

This method of treatment is usually but improperly referred-to as a "shredding" process. In point of fact, shredding is by definition a reduction by chopping and tearing whereas the reduction process is carried out in this case by percussion and shearing. The method proves satisfactory in regard to the quality of the end product since it results in clean, compact and uniform scrap metal which is easy to handle, but nevertheless suffers from major drawbacks.

In the first place, the need to employ a sufficiently high percussion or impact rate whereas the speed of rotation of the rotor is necessarily limited makes it necessary to provide a rotor having a large diameter and very generally entails the need to reduce the inertia of this latter by adopting a cruciform arrangement (hammers pivotally mounted at the ends of arms located in two perpendicular diametral planes). The overall size of the apparatus is in that case very substantial. In addition, the loaded metallic carcasses lodge themselves at least to a partial extent within the spaces formed between the hammer-carrying arms and in the direction of the rotor hub, which is liable to result in clogging or at least in slowing-down.

A further major disadvantage lies in the fact that the processed material is both deformable and pliable whereas this state is not readily compatible with a percussion process from an economic standpoint. In fact, percussive action is distinguished from other actions by the high rate of applied stress. Within a very short period of time, the entire quantity of available energy is delivered as transformation energy and its use for the formation of ruptures becomes less effective as a greater part of this energy is absorbed in order to produce deformations.

Thus it comes about that in the devices employed for carrying out this conventional method of treatment, the consumption of energy is increased by a combination of such factors as inertia of the large-sized rotor, slowing-down as a result of clogging, percussion energy partly absorbed by the deformations. In installations of this type, power requirements amount to more than 100 HP for a production rate of 1 ton per hour. Space requirements are also very considerable and capital cost is of a very high order. Finally, maintenance is also costly since the articulated hammers are expensive and subject to rapid wear.

It should further be noted that the need to provide a rotor of large diameter in order to obtain a sufficiently high percussion rate results in large installations which have a high theoretical production capacity. Existing installations of this type are capable of processing 10 to 15 tons of scrap metal per hour. It is nevertheless emphasized that this is a purely theoretical production rate. Difficulties arising from economical supply (limitation of the path of travel of unprocessed scrap metal) and the time involved in preparation of carcasses (disassembly of heavy parts) prior to introduction into the grinding mill result in the fact that, in the majority of cases, these installations are only employed at one-half or less than one-half their maximum capacity. In other words the grinding mill is in operation only one-half of the time and this increases capital depreciation costs to a considerable extent.

It is primarily with a view to reducing the cost price of processed scrap metal through the achievement of a very appreciable reduction in the cost of the installation, a considerable reduction in energy consumed per unit of weight and an equally considerable reduction in maintenance costs and capital depreciation costs that the present invention provides a machine for the reduction of thin scrap metal parts by means of a veritable shredding process or in other words a reduction which is carried out by attrition, shearing, tearing and also rolling. An installed power rating of 100 HP accordingly permits a production of 5 to 7 metric tons per hour and the shredder which is driven by a motor having this power rating makes it possible to absorb metallic carcasses having maximum dimensions of 1850 × 1450 × 4500 mm. It is thus possible to process not only casings of washing machines, refrigerators, cookers and the like, containers such as drums, cans and so on as well as metallic furniture, bicycles and so forth but also practically all wrecks of passenger cars or commercial vehicles without any need for previous flattening. It is of course possible to contemplate an increase both in the installed power rating and in the dimensions of the shredding unit; this would have the effect of increasing the production capacity and the maximum volume of processed carcasses.

A further advantage is apparent in the reduction of environmental disturbance as a result of a drop in the level of noise (suppression of percussions or impacts).

It is readily understood that the accessory treatment operations such as dust extraction, magnetic sorting, vibratory screening and so forth remain the same and the end product exhibits the same qualities as the product obtained in known installations.

The invention relates to a shredding unit which is essentially constituted by a drum rotatably mounted on a substantially horizontal shaft extending transversely within the interior of a cage having a front feed opening, said drum being provided with a plurality of knives rigidly mounted on the circumference thereof and being partly surrounded over approximately two-thirds of its periphery starting from the threshold of the feed opening by an evacuation grid or wearing plate provided with calibrated holes whilst an aligned array of substantially juxtaposed backing knives is placed at each end of the grid opposite to the drum and over the entire length of said drum, said backing knives being adapted in the active position thereof to project inwards with respect to the grid in such a manner as to ensure that the knives of the drum pass in the immediate proximity of said backing knives but being each mounted at the extremity of a pivotal support plate or so-called cutter-gate in such a manner as to permit a movement of withdrawal under the excessive pressure of a large mass in opposition to an elastic means having a predetermined and substantially constant force which urges each backing knife to said active position.

Further characteristic features of the invention will become more readily apparent from the following description of one embodiment of the invention, wherein.

Figure 1:
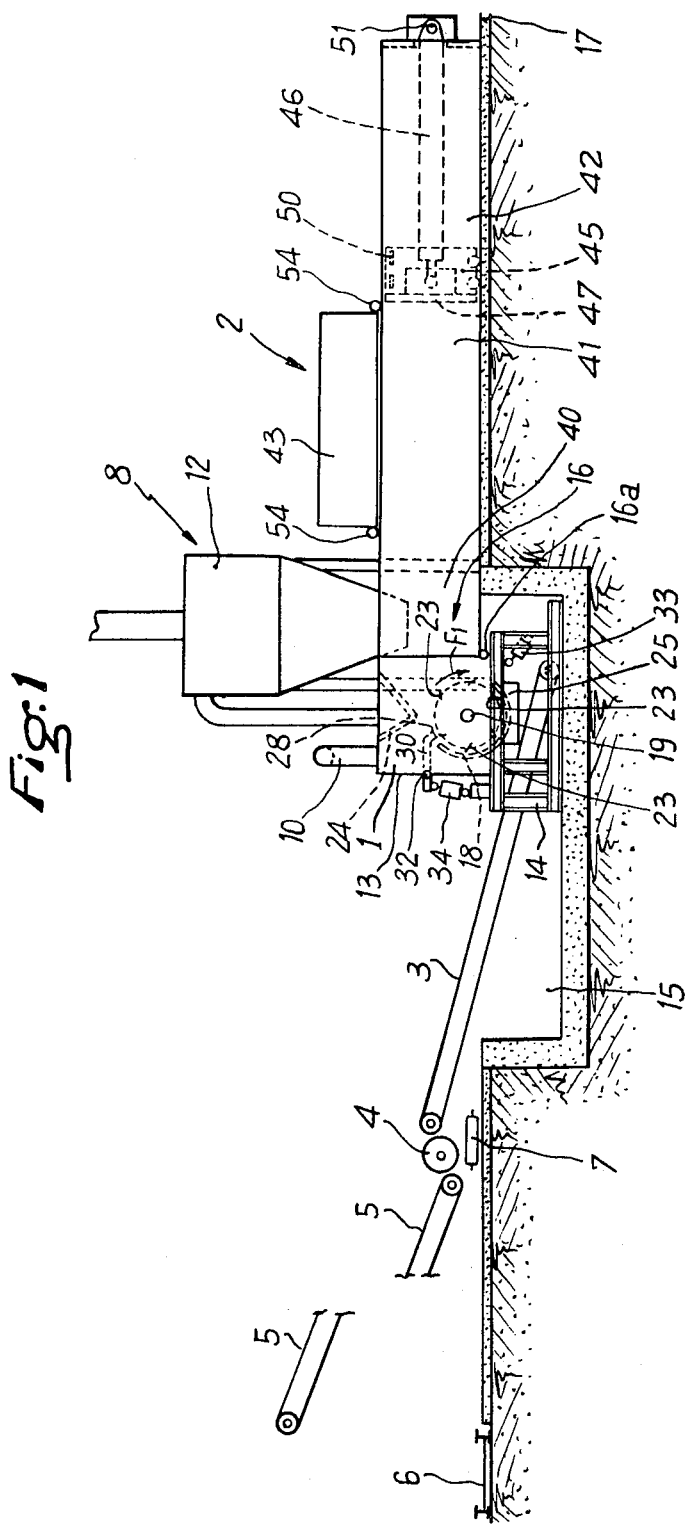
FIGS. 1 and 2 are views taken respectively in elevation and from above, showing a complete installation for processing scrap metal and comprising a shredding unit in accordance with the invention.
Figure 2:
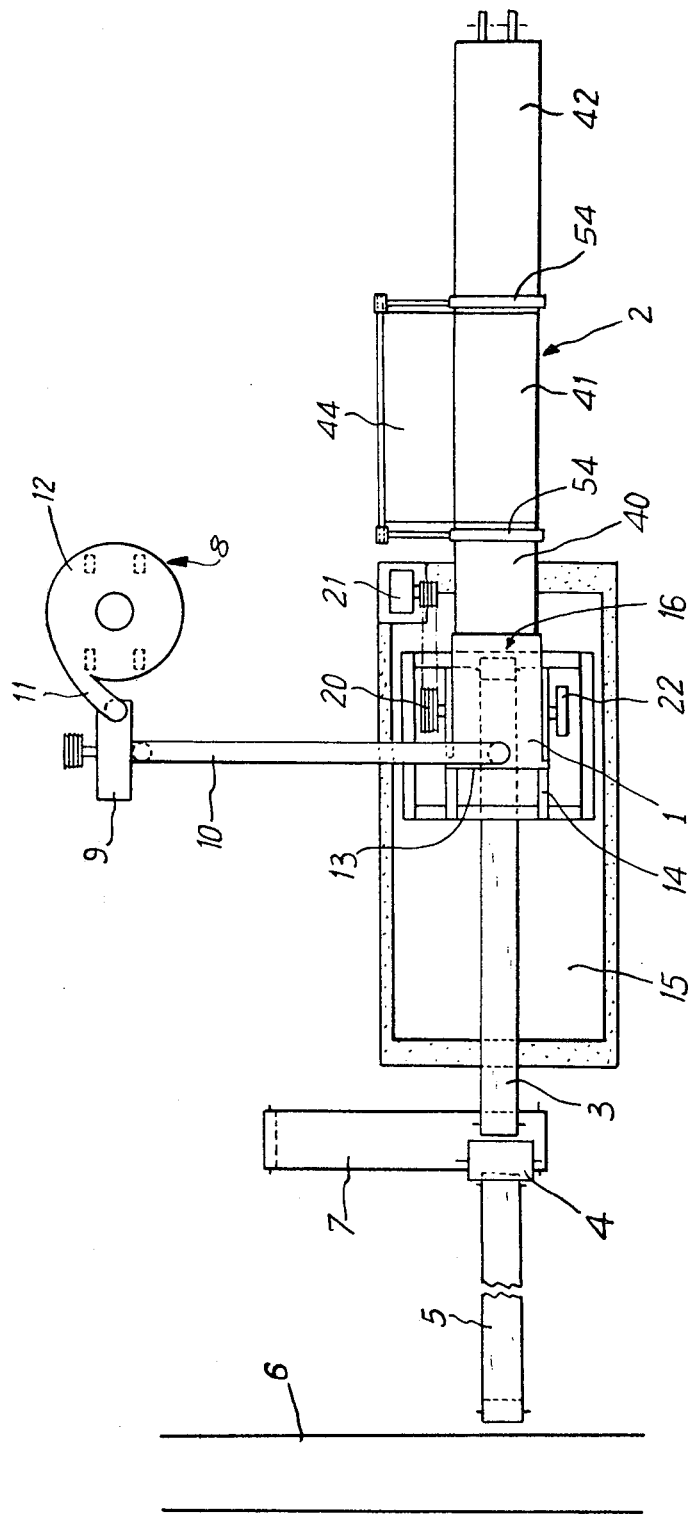

As shown in FIGS. 1 and 2, an installation for conditioning thin scrap metal parts comprises a reduction or shredding unit 1, a system 2 for feeding the shredding unit, a conveyor belt 3 for collecting the scrap metal beneath the shredding unit and directing it towards a magnetic drum 4, another conveyor belt 5 which receives the magnetic scrap metal from the drum 4 in order to discharge said scrap metal to a storage area or a loading track 6, a third conveyor belt 7 for collecting non-ferrous metals beneath the magnetic drum 4 and removing them laterally and finally a unit 8 for the suction of dust and waste materials of no value.

Although not illustrated in the drawings, provision can be made for additional stations such as one or a number of screening stations (vibrating drum or screen), a vibratory channel upstream of the magnetic drum, a manual sorting station on the path of travel of the belt 7 for conveying non-ferrous products. Similarly, the dust extraction unit 8 can have at least one suction intake at another point of the installation, for example above the screening station, and a series of magnetic drums mounted in cascade can be substituted for the magnetic drum 4.

In the example which is illustrated, the dust extraction unit 8 comprises a large-capacity dust-exhauster 9, a suction duct 10 which connects the exhauster to the top portion of the cage of the shredding unit 1, a discharge duct 11 which connects the exhauster to a cyclone 12 and a worm or auger (not shown) for discharging waste materials deposited at the base of the cyclone.

The various work stations other than the shredding unit 1 and its feed system 2 are equipped with conventional and well-known devices which will not be described in greater detail.

Figure 3:
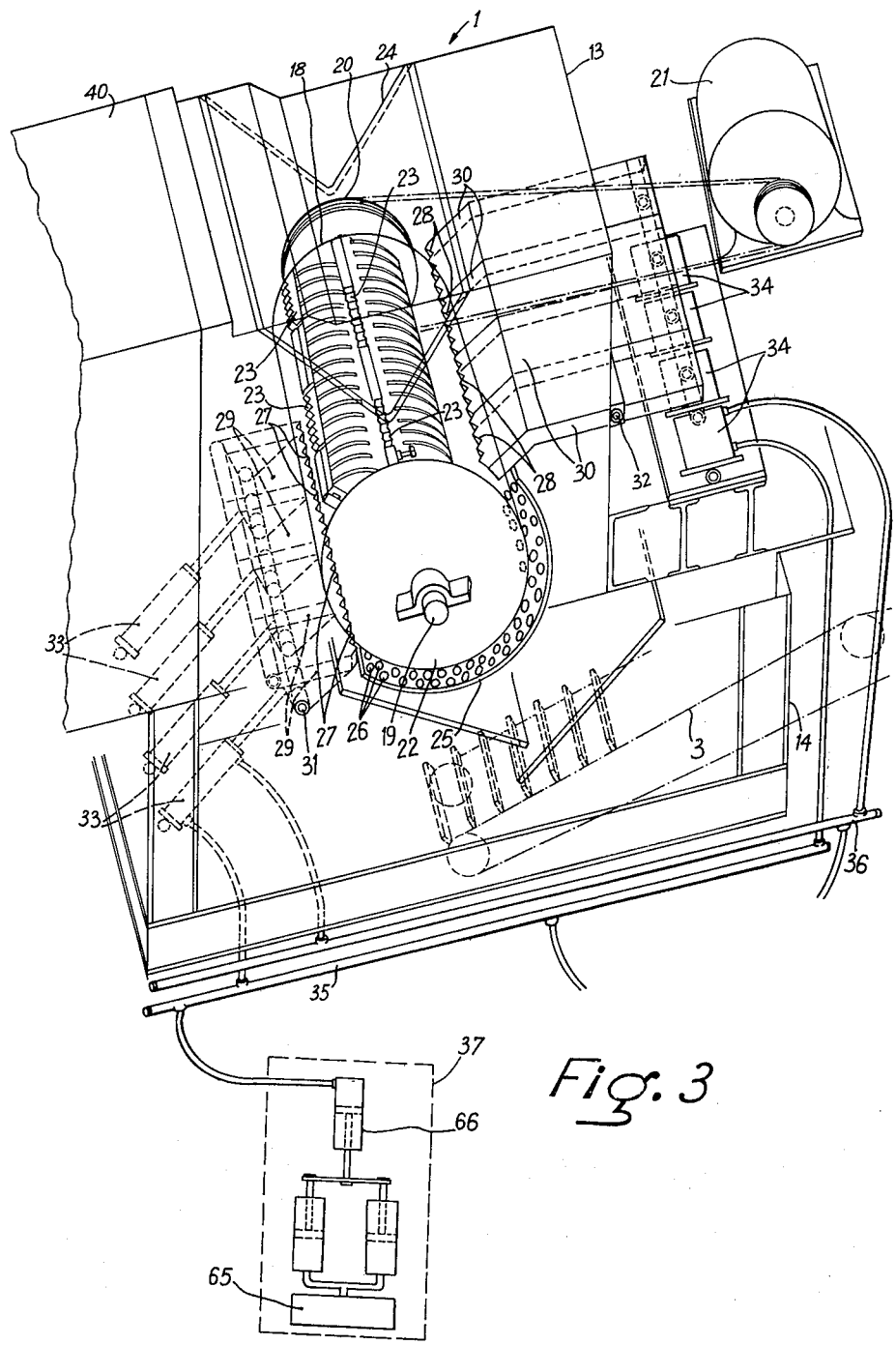
FIG. 3 is a fragmentary view in perspective showing the shredding unit and the essential components of this latter.

The shredding unit 1 (as shown in FIGS. 1, 2 and 3) comprises a cage 13 of generally parallelepipedal shape which is supported by a frame 14 placed within a pit 15. The front face of said frame which is directed towards the feed system 2 is provided with a rectangular feed opening 16, the threshold 16a of which is located substantially at the level 17 of the ground or more precisely of the concrete floor of the installation. Within the interior of the cage 13, a cylindrical drum or rotor 18 rotates about its shaft 19 which is mounted horizontally on two articulated roller-bearings. The shaft 19 is located transversely to the cage 13 and the drum is driven in rotation in the direction of the arrow F1 by means of a pulley 20 driven by an electric motor 21 whilst an inertia flywheel 22 is keyed on the opposite extremity of the shaft 19.

The drum 18 is provided with a plurality of cutters or knives 23 which are rigidly mounted on the circumference of said drum. In the example which is illustrated, all the knives 23 are identical, are twelve in number and each have a length equal to one-quarter of the length of the generator-lines of the drum. Said knives are distributed in pairs on six generator-lines or so-called bearing generator-lines in angularly equidistant relation and are arranged in alternate sequence; in other words, if the two knives occupy the first and the third quarter of the length along one bearing generator-line starting from one of the extremities of the drum, the knives of the following or of the preceding generator-line occupy the second and the fourth quarter of said length starting from the same extremity. In other words the centers of the knives are disposed at the intersection of the six equidistant generator-lines located at angular intervals of 60° with three helices which are angularly equidistant by 120° and have a pitch which is one and a half times the length of the drum. It is readily apparent that the pitch of the helices changes in the case of different lengths of knives but in order to have an alternate arrangement in quincuncial or staggered relation, the knives are always located at the intersection of $2n$ equidistant generator-lines and of $n$ equidistant and parallel helices.

Above the drum, the top wall of the cage 13 carries a V-shaped plate 24, the downwardly-directed arris of which is parallel to the axis of rotation and extends over the entire length of the drum in substantially vertical relation to the top generator-line of said drum. Said plate plays the same part as a deflector in a gas stream. It accordingly bring back towards the drum the metallic carcasses which have been pushed through the feed opening 16 together with the balls of shredded scrap metal which were not discharged at the end of the initial cycle as will be explained hereinafter; at the same time, said plate 24 performs the function of a veritable deflector for the suction air stream of the dust extraction unit. On the side remote from the plate 24, the drum 18 is surrounded over slightly less than two-thirds of its periphery starting from the threshold 16a of the feed opening 16 by an evacuation grid 25 provided with calibrated holes 26.

An aligned array of juxtaposed backing knives such as the knives 27 and 28 is disposed opposite to the drum over the entire length of this latter at each extremity of the grid 25, that is to say at the threshold 16a of the feed opening 16 and upstream of the arris of the V-shaped plate. The knives and the backing knives preferably all have the same length and, in each aligned array, the number of backing knives is equal to the number of knives located on two successive bearing generator-lines of the drum, namely four in the example shown. Each backing knife is attached to the extremity of an elbowed plate or so-called cutter-gate 29, 30. In the example illustrated, there are therefore four cutter-gates 30 known as high gates in the vicinity of the other grid extremity. The low gates 29 are pivotally mounted on a shaft 31 and the high gates 30 are pivotally mounted on a shaft 32. The work faces of the knives and backing knives are formed by a series of straight teeth located transversely with respect to the axis of rotation and so arranged that each time they pass, the teeth of the knives interengage with the teeth of the corresponding backinng knives when these latter project inwards with respect to the grid 25. Both the knives and the backing knives are naturally made of special steels.

In the active or work position, the backing knives project inwards with respect to the grid and are each urged towards this position by an elastic means which produces action on the corresponding pivotal gate. The end-of-travel stop in this position is such that the interval between a backing knife and a knife at the moment of passing of this latter is of the order of 15 mm. In the example which is illustrated, the elastic means aforesaid are each constituted by a hydraulic jack 33, 34. All the jacks are operated simultaneously. When the cutter-gates close or in other words when the active position of the backing knives has been reached, the supply pipe 35 which is common to all the jacks is isolated from the power-driven control pump set (not shown in the drawings) and put into communication with an oleopneumatic regulator shown diagrammatically at 37 in order to prevent any abrupt return motion and surging by means of damper 66. The dimensions and the characteristics of the jacks and of the oleopneumatic regulator are selected so as to apply to the cutter-gates 29 and 30 a predetermined force of relatively high value (3 to 10 tons according to the type of scrap metal to be processed) while requiring only a low pressure of compressed air (approximately one bar) in order to prevent air leakages. The jacks 33 of the low gates 29 and the jacks 34 of the high gates 30 are preferably double-acting jacks in order that opening of the cutter-gates may be initiated by means of the power-driven pump set in the event of accidental blockage and also in order to permit inspection visits. This control operation produces action on all the cutter-gates by means of a common supply pipe 36. In the work position, said pipe 36 is connected directly to the hydraulic reservoir (not shown in the drawings).

In the example which is illustrated, the calibrated holes 26 of the evacuation grid 25 have a diameter of approximately 70 mm, the knives pass at a distance of approximately 115 mm from the grid, the drum has a length of approximately 1.5 m and a diameter of approximately 140 cm, the weight of the inertia flywheel 22 is 2000 kg and the driving motor 21 is a 100 HP motor which drives the drum at a speed of 600 rpm. With these characteristics, the shredding unit ensures a production of 5 to 7 metric tons per hour according to the quality and the structure of the carcasses being processed.

Figure 4:
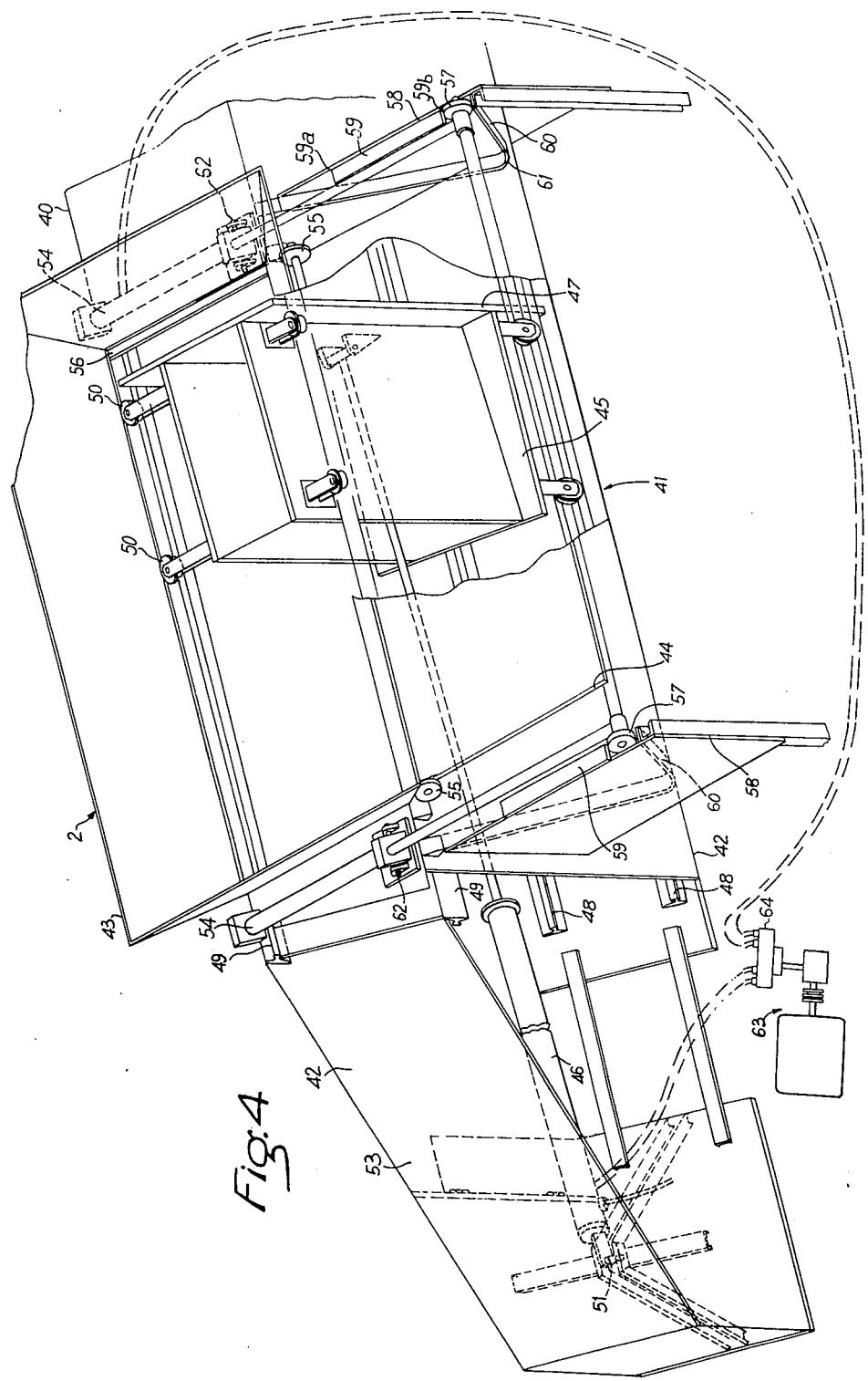
FIG. 4 is a diagrammatic view in perspective showing the feed system of the shredding unit.

The feed system 2 shown in FIGS. 1, 2 and 4, is essentially constituted by a tunnel having a rectangular internal cross-section which is equal to that of the feed opening 16 of the shredding unit cage. Said tunnel comprises a compression passage 40 which is joined to the feed opening 16, a central portion or channel 41 having a sliding roof and an extension 42 at the end remote from the shredding unit. There is placed above the channel 41 a loading hopper 43, the bottom of which is constituted by the sliding roof 44 of said channel. A carriage 45 is driven in reciprocating motion within the interior of the tunnel under the action of a double-acting hydraulic jack 46. There is mounted on the front face of the carriage 45 a push-plate 47 having dimensions which closely conform to those of the internal cross-section of the tunnel. Said carriage is displaceable on two rails 48, guiding of the carriage being reinforced by means of two side rails 49 adapted to cooperate with horizontal rollers 50 placed at the top of said carriage. The foot of the jack 46 is pivotally mounted at a fixed point 51. The end position of forward motion of the push-plate is located in the vicinity of the entrance of the compression passage 40 and its end position of withdrawal (limit of return motion) is located in the extension 42 at a distance of approximately 50 cm upstream of the entrance of the channel 41. Over practically its entire length, the extension 42 thus constitutes only a protective cage for the jack 46 and the carriage 45 in the position corresponding to the end of return travel; in contrast to the remainder of the tunnel, the walls of the whole of this portion which is not traversed by the push-plate 47 can therefore have an open structure or be constituted at least partially by a grating (not shown). Said extension is in any case provided with an inspection door 53 in order to permit access to the jack.

The sliding door 44 which forms both the sliding roof of the channel 41 and the bottom of the loading hopper 43 is intended to slide laterally under the action of two double-acting hydraulic jacks 54. As shown in FIG. 4, said door is fitted at the extremities of the edge which sweeps the entire width of the channel or so-called inner edge with two rollers 55 which are capable of running respectively on two transverse roller tracks 56 placed inside and at the bottom of the walls of the hopper 43. The opposite edge or outer edge of the door 44 is also fitted with two rollers 57; these latter have a track-width which exceeds the length of the hopper and are intended to run along roller tracks carried by supports 58 which extend laterally on the corresponding side of the channel. In the case of each roller 57, provision is made on the same support 58 for two roller tracks 59 and 60. The roller track 59 is horizontal and extends along the central portion of the top edge of the support 58 from a point 59a located at a distance from the channel which is less than one-half the path of travel to a point 59b such that, at the end of the opening travel, the roller 57 is no longer supported by said roller track. The other roller track 60 extends over the entire length of the path of travel but has a substantial downward curvature 61; the jacks 54 which are placed transversely to the channel on each side of the hopper 43 and the inner rods of which are pivotally mounted on the shaft of the corresponding roller 57 are each mounted so as to be capable of pivotal motion about a pin 62 located substantially in vertically overhead relation to the longitudinal wall of the channel 41 on the same side as the supports 58.

The dimensions of the channel and of the hopper correspond to those of the largest metallic carcasses to be processed. In the example illustrated, these dimensions are 1850 × 1450 × 4500 mm. In this case, the compression passage 40 has a length of approximately 250 cm and the extension of the jack 46 must be 500 cm.

As will be mentioned hereinafter, certain electrical or pneumatic connections are established between the different control and actuating means in order to ensure safety or coordination or both combined. Such connections are well known and will be mentioned without being described.

The operation of this assembly is clear. At the outset, the jack 46 is in the withdrawn position, the carriage 45 is in the end position of return within the extension 42 of the tunnel, the sliding door 44 in the closed position shuts-off the passage between the hopper 43 and the channel 41. After ensuring that the low gates 29 and high gates 30 of the shredding unit are closed by means of the pump set and checking the hydraulic pressure within the jacks 33 and 34, said jacks are cut-out of the circuit of said pump set and the common supply pipe 35 is connected directly to the oleopneumatic regulator 37. The motor 21 is started up and drives the drum 18 in rotation. The hopper is then loaded with metallic carcasses which have been prepared as stated earlier (removal of readily detachable non-metallic portions as well as metallic portions having a thickness of more than 5 mm); in the case of motor vehicle wrecks, a single car body is likely to fill the hopper. It should be noted that the height of the edge of the hopper above the floor level 17 is approximately 320 cm, thus permitting of easy loading.

A power-driven pump set 63 initiates the extension of the jacks 54 of the sliding door 44 by means of a distributor 64. Said door slides laterally along the edge of the channel 41, the rollers 55 being intended to run on the roller tracks 56. Before the longitudinal center-line of said door reaches the edge of the channel, the rollers 57 are applied at 59a against the roller tracks 59, the movement of the door continues in a horizontal direction and the load contained in the hopper 43 falls into the channel 41. This initial operation is carried out by manual control of the distributor and the installation is set for continuous operation from this moment.

The first stage of a complete cycle is the closure of the sliding door 44 by means of the distributor which initiates the movement of withdrawal of the jacks 54. In the open position of the door, the rollers 57 are not applied against the roller tracks 59 since they are located beyond the point 59b. Said rollers are accordingly resting on the end portions of the concave roller tracks 60. The sliding door tilts to a greater extent under the action of gravity as it travels further since it is in overhung position on the edge of the channel while the rollers run along the tracks 60, the jacks 54 pivot about the pins 62 and the rollers 55 are lifted in empty space above the roller tracks 56. When the rollers 57 reach the lowermost point 61 of the roller tracks 60, the door has an inclination of approximately 45° and is maintained at this angle when the rollers 57 begin to run along the opposite slope of the roller tracks 60. When the center of gravity of the door 44 passes beyond the bearing edge of the channel 41, said door pivots towards the horizontal position until the rollers 55 come into contact with the roller tracks 56. The pivotal motion of the door which is of substantial weight produces if necessary the flattening by compression of the load of carcasses in order to reduce this latter to the exact dimensions of the channel.

As soon as the door 44 reaches its fully closed position, the carriage jack 46 is actuated in extension as a result of operation of the distributor 64 and the push-plate 47 drives the load towards the compression passage 40 and the opening 16 of the shredding unit at a predetermined speed. Re-loading of the hopper is carried out while this operation takes place.

When the push-plate reaches the entrance of the compression passage, the total extension of the jack 46 initiates reversal of motion and the carriage 45 together with its push-plate 47 commences its return process.

As soon as the push-plate reaches the end of return travel, a contact which can be placed on the jack 46 or actuated by the transfer motion of the carriage 45 produces action on the distributor 64 which then supplies the jacks 54 of the door 44, thus initiating the door-opening operation and another cycle begins.

Within the shredding unit, the metallic carcasses which are driven forward by the push-plate 47 are caught by the knives 23 and shredded between these latter and the backing knives 27 of the low cutter-gates 29. As a result of rolling between the knives 23 and the grid 25, the shredded scrap metal parts are crumpled into the shape of balls and when the maximum diameter of these irregular balls is less than 70 mm along any axis, they pass through the grid 25 and are discharged by the conveyor belt 3. At the same time, the brittle non-metallic portions are crumbled and drawn-up by the dust extraction unit. The balls which are too large to pass through the grid as well as those fragments of scrap metal which have not been sheared by a knife are again "ground" between the knives 23 and the backing knives 28 of the high cutter-gates and carried away for further treatment against the backing knives 27 either directly or after striking the V-shaped plate 24. Thus, after a variable number of treatment operations, the entire feedstock of scrap metal is finally reduced to crumpled balls having diameters of less than 70 mm.

If an excessively large or particularly resistant mass is impelled by the drum and cannot pass between a knife and a backing knife or between the drum and a backing knife, this latter withdraws and discharges oil from the jack of the corresponding cutter-gate to the oleopneumatic regulator 37. It is apparent that this discharge of oil produces only a small variation in the general oil pressure within all the jacks. This variation is as small as may be desired by virtue of a judicious choice of the volume of the compressed air reservoir-tank 65. Furthermore, as soon as the exceptional effort applied to the backing knife is discontinued, said backing knife returns to its active position without either abruptness or floating motion.

Further safety and coordination devices can be provided as has already been stated earlier. From this it follows, for example, that the motor 31 which serves to drive the drum can be equipped with a regulating system for increasing the speed or stopping the jack 46 of the push-plate carriage 45. To this end it is only necessary to connect the motor 31 to a current-measuring relay. When the current consumption of the motor exceeds the normal requirements of this latter, the relay is energized and produces action on an electro-valve which operates a slide-valve of the distributor 64 and the pressure of the hydraulic circuit which controls the jack 46 is returned to the reservoir. As soon as the motor reverts to its normal amperage, the relay is de-energized, the electro-valve and the distributor slide-valve return to their closed positions and the jack supply circuit is restored.

An installation of this type consumes a total of approximately 35 kW per ton processed instead of 175 to 180 kW as had previously been necessary in installations of the prior art.

I claim:

1. A shredding unit for conditioning thin scrap metal parts from motor vehicle wrecks or other metallic carcasses, said unit being intended to be placed directly after a supply unit at the inlet of a continuous conversion chain comprising conventional dust extraction equipment as well as screening and magnetic sorting equipment, and essentially constituted by a drum rotatably mounted on a substantially horizontal shaft extending transversely within the interior of a cage having a front feed opening, said drum being provided with a plurality of knives rigidly mounted on the circumference thereof and being partly surrounded over approximately two-thirds of its periphery starting from the threshold of the feed opening by an evacuation grid in the form of a wearing plate provided with calibrated holes, wherein an aligned array of substantially juxtaposed backing knives is placed at each end of the grid opposite to the drum and over the entire length of said drum, said backing knives being adapted in the active position thereof to project inwards with respect to the grid in such a manner as to ensure that the knives of the drum pass in the immediate proximity of said backing knives, said backing knives being each mounted at the extremity of a pivotal support plate in such a manner as to permit a movement of withdrawal under the pressure of an excessively large mass in opposition to an elastic means having a predetermined and substantially constant force which urges each backing knife to said active position.

2. A shredding unit according to claim 1, wherein the work surface of each of the knives and backing knives is formed by a series of straight teeth extending transversely with respect to the axis of rotation of the drum, the teeth of the knives being intended to interengage with the teeth of the backing knives each time they pass, wherein the interval between the work surface of a knife and the opposite work surface of the backing knife is substantially constant at all points, said interval being preferably of the order of 15 millimeters when the backing knife is in the active position.

3. A shredding unit according to claim 2, wherein the calibrated holes of the evacuation grid have a diameter of approximately 70 mm and wherein the clearance between said grid and the knives is approximately 115 mm.

4. A shredding unit according to claim 1, wherein the knives are disposed at the intersections of an even number of bearing generator-lines in angularly equidistant relation and a half number of angularly equidistant parallel helices, the knives of any one bearing generator-line being intended to sweep entirely the spaces which are left free between the knives of the preceding bearing generator-line.

5. A shredding unit according to claim 4, wherein all the knives and backing knives are of equal length and each of the two aligned arrays of backing knives consists of a number of backing knives equal to the number of knives carried by two successive bearing generator-lines.

6. A shredding unit according to claim 1, wherein the elastic means for urging each backing-knife support plate to the active position is constituted by a hydraulic jack, the pipe for supplying all the jacks being connnected to an oleopneumatic regulator having a substantially constant pressure.

7. A shredding unit according to claim 6, wherein all the hydraulic jacks provided for the backing-knife support plates are double-acting jacks which can be controlled simultaneously and caused to return to their withdrawn positions in the event of inspection and maintenance or in the event of accidental blockage, the corresponding supply pipe being connected freely to the hydraulic reservoir during operation of the shredding unit.

8. A shredding unit according to claim 1, wherein the system for feeding the unit is constituted by a tunnel of rectangular cross-section which is connected to the feed opening of the shredding unit and in which a track-supported carriage is capable of displacement in back-and-forth motion under the action of a double-acting hydraulic jack, the front end of said carriage being adpated to carry a push-plate having dimensions which closely conform to those of the cross-section of said tunnel, whilst the central portion or channel of said tunnel is surmounted by a loading hopper and separated therefrom by a hydraulically controlled sliding door, the opening of said door being initiated automatically when the push-plate carriage reaches an end position remote from the shredding unit and the closing of said door being initiated automatically prior to starting of said carriage in the direction of said shredding unit.

9. A shredding unit according to claim 8, wherein the sliding door forming the channel roof and the openable bottom wall of the loading hopper is fitted with four rollers disposed respectively in proximity to each corner of said door, the two rollers placed at the edge of the door which sweeps the entire width of the channel being capable of traveling respectively on two transverse roller tracks placed inside and at the bottom of the hopper walls whilst the two rollers placed at the opposite edge and having a track-width exceeding the length of the hopper are capable of moving during the opening travel except at the beginning and at the end thereof along horizontal roller tracks mounted on supports which are external to the tunnel and during the closign travel on downwardly-curved roller tracks so that the door performs a pivotal movement under the action of gravity at the mid-point of said closing travel and thus results in flattening of the loaded metallic carcasses when they project beyond the level of the top edge of said channel.

10. A shredding unit according to claim 8, wherein a current-measuring relay connected to the drum-driving motor produces action on an electrovalve which operates a slidevalve of the push-plate jack supply distributor in order to stop the movement of extension of said push-plate jack when the consumption of the motor becomes abnormal as a result of abnormal resistance.

* * * * *